June 19, 1956
L. K. SNYDER
2,751,306
PLASTIC-LIKE FOOD PRODUCT PACKAGING
Filed Dec. 17, 1953
2 Sheets-Sheet 1
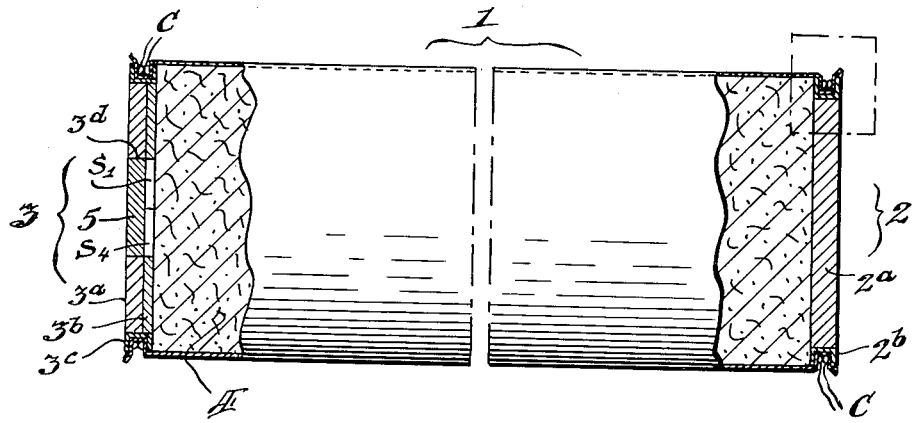
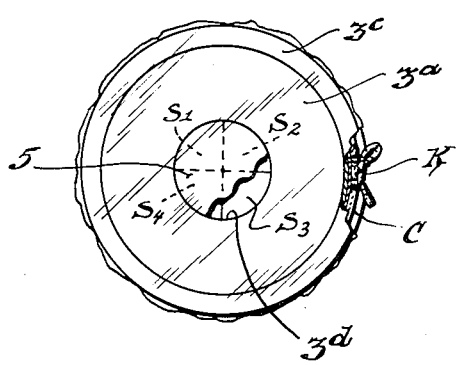
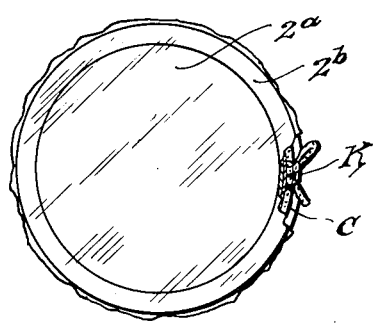
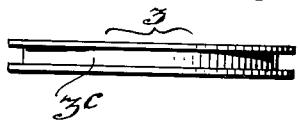
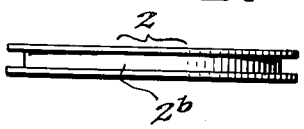
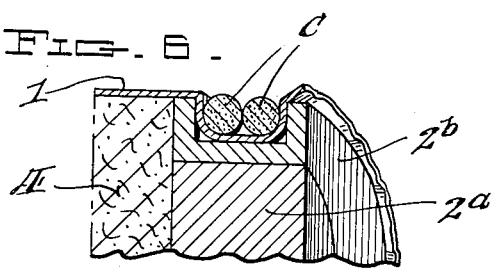
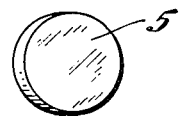
INVENTOR:
Lloyd K. Snyder,
BY
Alfred E. Ockinger
ATTORNEY.

June 19, 1956
L. K. SNYDER
2,751,306
PLASTIC-LIKE FOOD PRODUCT PACKAGING
Filed Dec. 17, 1953
2 Sheets-Sheet 2
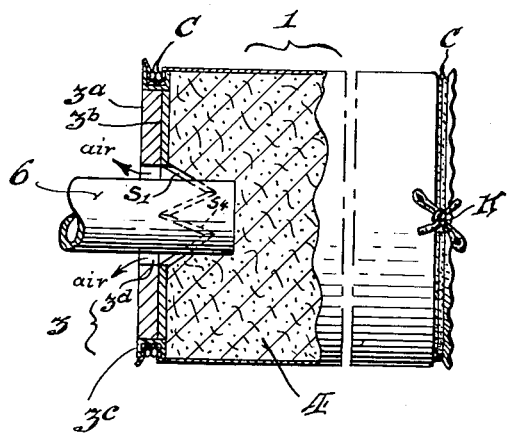
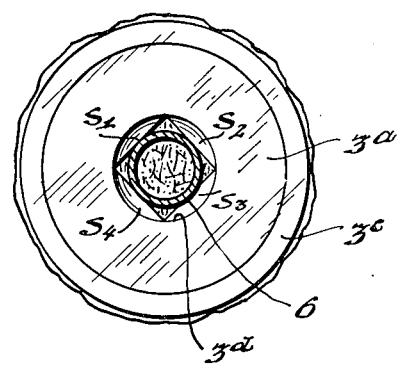
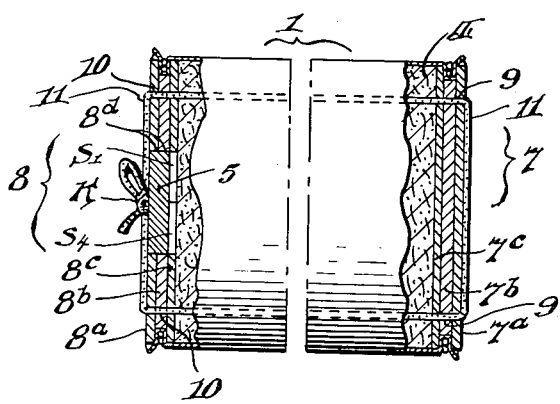
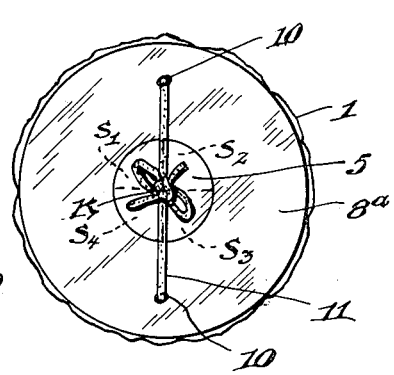
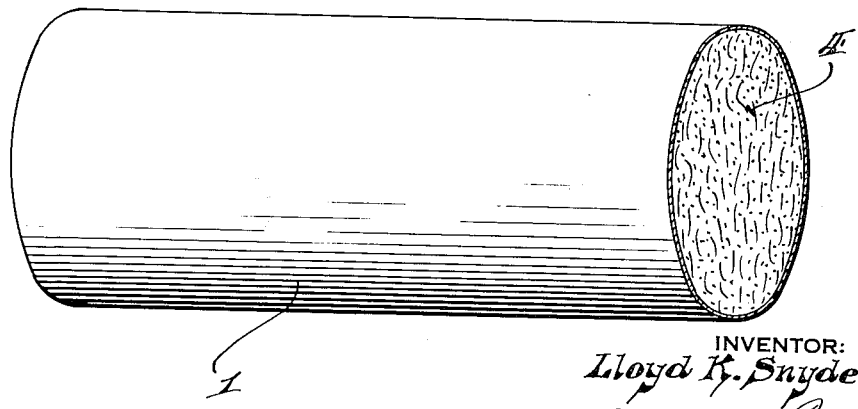
INVENTOR:
Lloyd K. Snyder,
BY
Alfred E. Ockinger
ATTORNEY.

United States Patent Office 2,751,306
Patented June 19, 1956

2,751,306
PLASTIC-LIKE FOOD PRODUCT PACKAGING

Lloyd K. Snyder, Fleetwood, Pa.

Application December 17, 1953, Serial No. 398,810

6 Claims. (Cl. 99—171)

This invention relates to containers or casings for food products, such as plastic-like edible products including raw and smoked meat products, plain and spiced sausage materials, puddings, dairy products, etc., and more particularly concerns a novel container for such products which facilitates cutting or slicing of the entire contents of the container in portions or segments of uniform size and shape so as to avoid the usual wastage, sales resistance and detrimental conditions heretofore prevailing in connection wth the merchandising and handling of such products when provided in containers necessitating cuttings of different, irregular, or undesirable size or shape.

One object of my invention is to provide a novel, structurally simple and relatively inexpensive food product container, or casing, of the type indicated.

Another object is to provide such a container which has certain structural and functional features of advantage over the similar food product containers of the prior art.

A further object is to provide such a container which comprises a tubular or cylindrical member formed of flexible material such as textile material, non-porous plastic material, etc., and two separate flat substantially rigid end-wall forming elements or discs, each having a peripheral groove, which elements are respectively sealingly secured in transverse relation within the end sections of the tubular member.

An additional object is to provide such a container in which one of the said flat end-wall forming elements is provided with a novel self-closing inlet aperture forming structure.

Another object is to provide such a container in which the said end-wall forming elements are sealingly secured within the end sections of the tubular container member by flexible means, such as a flexible strand, cord, string, etc.

It is also an object of the invention to provide various unique container end-wall forming elements that are readily combinable in sealed relation with a flexible tubular or cylindrical container body forming member in such manner as to endow the resultant food product container with special practical and commercial features of advantage over hte similar prior art containers.

Another feature of the invention resides in the provision of a novel food product containing device comprising a cylindrical member formed of thin non-porous material, a flat substantially rigid end-wall forming disc having a peripheral groove and a central self-closing segmental inlet aperture structure integrally formed from an inner wall portion thereof in adjacent axial alignment with a circular cavity formed in its outer wall portion thereof, a plug element sealingly mounted in said circular cavity, a flexible strand arranged to sealingly secure said disc in transverse relation within one end section of the member, a second flat substantially rigid end-wall forming disc having a peripheral groove, and a flexible strand arranged to sealingly secure said second disc in transverse relation within the other end section of said cylindrical member.

It is also an object to effect the filling of such a container with a food product by a new method.

With these and other objects in view, which will become more readily apparent from the following detailed description of the various practical and illustrative embodiments of my improvements shown in the accompanying drawings, the invention comprises the novel food product container, elements, features of construction and arrangement of parts in cooperative relationship, as more particularly defined by the hereto appended claims.

In the accompanying drawings:

Figure 1 is a side elevational view, partly broken away and in section, of one practical form of food product container device in accordance with my invention.

Fig. 2 is an end elevational view of the device shown in Fig. 1, as seen from the left.

Fig. 3 is an end elevational view of the device shown in Fig. 1, as seen from the right.

Figs. 4 and 5 are respectively, detail edge views of the two container end-wall forming elements shown in Figs. 2 and 3, which elements constitute parts of my invention.

Fig. 6 is an enlarged detail perspective view of the portion of the food product container device indicated in dot-and-dash outline in Fig. 1.

Fig. 7 is a perspective view of the circular disc or plug element appearing in Figs. 1 and 2.

Fig. 8 is a condensed side elevational view, partly broken away and in section, of a food product container device similar to that shown in Fig. 1, but with a food product feeding nozzle inserted through the inlet aperture structure formed in one of the end-wall forming discs thereof, which nozzle is in readiness to be withdrawn so as to effect self-closing action or movement of the segmental parts of the inlet structure.

Fig. 9 is an end elevational view of Fig. 8 as seen from the left.

Fig. 10 is a condensed side elevational view, partly broken away and in section, of a modified form of food product container device in accordance with my invention.

Fig. 11 is an end elevational view of the device shown in Fig. 10, as seen from the left, and Fig. 12 is a side perspective view of my novel food product container device shown in Fig. 1, after the end-wall forming elements have been removed therefrom, or cut away, so as to leave the entire container contents in the form of a cylindrical roll in readiness for uniform slicing without wastage.

Referring more particularly to Figs. 1 to 7 inclusive of the drawings, my novel food product container device there shown generally comprises a tubular or cylindrical main body or casing member 1, end-wall forming elements 2 and 3, and a plastic-like food product 4 within the container, such as a raw or smoked sausage material.

The tubular casing member 1 is preferably formed of a non-porous flexible plastic material, such as cellophane. However, it is to be understood that the member 1 may be formed of some other type of flexible material, if desired, such as a textile woven or knitted material, having sufficient strength and embodying those characteristics and qualifications which comply with the various state and federal regulations or laws governing the use of such materials for enclosing food products of the kind here involved.

The end-wall forming element 2 is formed of a substantially rigid material, such as a plastic material, wax impregnated cardboard, etc., and comprises a circular or disc-like main body member 2$^a$ to which is fixedly secured a separate peripherally grooved rigid rim member 2$^b$. The members 2$^a$ and 2$^b$ may be fixedly joined by suitable adhesive means, or in any other practical manner.

The end-wall forming element 3, as shown in Figs. 1 and 2, comprises two juxtaposed circular discs $3^a$ and $3^b$, that are also fixedly joined with each other by adhesive means (not shown), or by some other practical and desirable means. A peripherally grooved rigid rim member $3^c$ is also fixedly secured to the discs $3^a$ and $3^b$, in like manner, and as clearly shown. The disc $3^b$ is formed of a substantially rigid material, such as wax impregnated cardboard and is centrally provided with a self-closing circular inlet aperture structure comprising four similar disc segments or sections $S_1$, $S_2$, $S_3$ and $S_4$, whose outer curved portions are integrally joined with, or form part of the disc $3^b$ and whose straight free side edges result from diametrically cross cutting the central portion of the cardboard disc $3^b$ so that the diametrical cuts are in 180° angular relation with each other, as clearly shown in Fig. 2. The outer disc $3^a$ of the end-wall forming element 3 is also formed of a substantially rigid material of the type indicated and is provided with a central aperture $3^d$, of the same diameter as the circular inlet aperture structure formed in the disc $3^b$, so that, when the segments $S_1$, $S_2$, $S_3$ and $S_4$ are in their inlet aperture closing position, as shown in Fig. 1, the aperture $3^d$ forms a circular cavity that extends from the outer surface of the element 3 to the segments $S_1$, $S_2$, $S_3$ and $S_4$, in which cavity is frictionally mounted or secured a disc-shaped closure or sealing plug 5, such as illustrated in Fig. 7, formed of cardboard, plastic material, etc.

The end-wall forming elements 2 and 3 are sealingly secured in transverse relation within the outer end portions of the tubular casing member 1 by flexible strands, such as strings, cords, twine, etc., indicated by the letter C, that are wrapped about the end portions of the flexible material of the member 1, at the location of the grooves in rim members $2^b$ and $3^c$ and tightened so as to force the said flexible material into the grooves of the rim members $2^b$ and $3^c$. Thereafter the strands C are secured in position by tying a knot K in the strands, as indicated in Figs. 2 and 3. The grooves in the rim members $2^b$ and $3^c$ are shown as being of a width and depth to accommodate therein two turns or convolutions of the strand C, but such dimensions may obviously be varied, if desired, so that the said grooves will accommodate therein a lesser or greater number of turns of the strand C.

Figs. 8 and 9 of the drawings illustrate the food product container device of my invention with a standard or conventional food product feeding pipe or nozzle 6 inserted through the circular self-closing inlet structure of the end-wall forming member 3. It is to be particularly noted that the nozzle 6 is of lesser diameter than the inlet aperture of the end-wall forming member 3 and this arrangement provides an air escape space in surrounding relation to the nozzle 6 that permits the air within the container device to escape as the device is progressively filled and packed with the raw or smoked meat product that is caused to flow under pressure into the device by the usual meat feeding apparatus (not shown) from which the nozzle 6 extends. After the container device has been filled to the fullest extent, the nozzle 6 is withdrawn from the device and this causes the triangular disc segments $S_1$, $S_2$, $S_3$ and $S_4$ to be automatically pushed to their inlet aperture closing position by the outward pressure exerted on the inner surfaces thereof by the meat product within the container device. A plug member 5 is then pressed and frictionally retained in position in the cavity $3^d$ of the member 3 as shown in Fig. 1, and the meat product container device of my invention is then completely sealed and in readiness for use as desired.

Figs. 10 and 11 illustrate a modified form of my food product container device. In this instance, there is provided an end-wall forming element 7 consisting of three separate juxtaposed circular discs $7^a$, $7^b$ and $7^c$ that are united by adhesive means and formed from a substantially rigid material, such as cardboard, plastic material, etc. The intermediate disc $7^b$ is of lesser diameter than the outer discs $7^a$ and $7^c$ so as to provide a peripheral groove in the element 7 for the same purpose as previously explained in connection with the description of the first form of my invention and as clearly shown. Similarly, there is provided an end-wall forming element 8 consisting of three substantially rigid separate juxtaposed circular discs $8^a$, $8^b$ and $8^c$, that are formed, united and arranged to provide a peripheral groove in the element 8 for the same indicated purpose. The discs $8^a$ and $8^b$ are centrally provided with a circular sealing plug receiving aperture $8^d$, that is similar to the aperture $3^d$ of Fig. 1, and the disc $8^c$ is centrally provided with a self-closing circular inlet aperture structure comprising four similar triangular disc segments or sections $S_1$, $S_2$, $S_3$ and $S_4$, that correspond with the similarly identified segments shown in Fig. 2.

The end-wall forming elements 7 and 8 are also respectively provided with two apertures 9—9 and 10—10 arranged in axially aligned relationship with each other, as clearly shown in Fig. 10, and adapted to receive a cord 11 arranged to extend through the container device and across the end members and the sealing plug 5 for the purpose of establishing a reinforcing connection between the elements 7 and 8.

To avoid repetitive descriptive matter, the other parts of the device shown in Figs. 10 and 11 which correspond substantially with the parts of the first form of my device previously described, are identified by similar reference characters.

Fig. 12 illustrates the appearance of my food product container device after the end-wall forming elements 2 and 3, or 7 and 8 have been cut therefrom so that the entire container contents, i. e., the meat product thereof, is in substantially perfect cylindrical form and in readiness for slicing into uniform discs or patties of desired size, without necessitating any irregular or wastage cuts.

Of course, it will be understood by those skilled in this are that the various novel improvements specifically shown and described can be changed and modified in various ways without departing from the invention herein disclosed and more particularly defined by the hereto appended claims. For example, if desired, the food product containing device can be provided in a shape other than cylindrical, such as in flat-sided or oblong shape and the cord arrangement for sealingly uniting certain parts of the device can be applied or supplemented by a separate cord, in such manner as to provide one or more loops, or extensions, adapted to serve as a suspension means for the device.

I claim:

1. A container for a plastic-like food product comprising, a tubular member formed of flexible material, a flat, thin substantially rigid end-wall forming element having a self-closing inlet aperture forming structure which is closed by the food product and which element is sealingly secured in transverse relation within one end section of said member, and a flat, thin, substantially rigid end-wall forming element sealingly secured in transverse relation within the other end section of said member.

2. A package comprising a plastic-like food product, a tubular member formed of flexible material, a flat substantially rigid end-wall forming element having a one way acting, self-closing central segmental inlet aperture forming structure which is held closed by said product and which element is sealingly secured in transverse relation within one end section of said member, and means arranged to sealingly close the other end section of said member.

3. A container for a plastic-like food product comprising, a tubular member formed of flexible material, a flat substantially rigid end-wall forming element having a peripheral groove and a self-closing central one way acting segmental inlet aperture forming structure adapted to be closed by said food product, flexible means for sealingly securing said element in transverse relation within one end section of said member, and means arranged to sealingly close the other end section of said member.

4. A food product containing device comprising, a cylindrical member formed of thin non-porous material, a flat substantially rigid end-wall forming disc having a peripheral groove and a self-closing central segmental inlet aperture structure integrally formed from an inner wall portion thereof in adjacent axial alignment with a circular cavity formed in its outer wall portion thereof, said aperture being closed by said food product, a plug sealingly mounted in said circular cavity, a flexible strand arranged to sealingly secure said disc within one end section of said member, and means arranged to sealingly close the other end setcion of said member.

5. A food product container adapted to be filled with a plastic-like food product and having an end-wall forming device comprising a flat substantially rigid disc provided with a central opening which may be closed by a plurality of integral segmental elements of the disc that are laterally swingable inwardly to effect opening of the container for filling thereof and swingable outwardly by the food product when the container is filled so as to effect closing of the said end wall.

6. The method of forming and packaging a plastic-like food product so as to enable the slicing of said entire product into bodies of disc-like formation, which comprises the steps of forming an elongated container of substantially uniform cross-sectional dimensions that is closed at one end and has a flat substantially rigid end-wall forming element sealingly secured in transverse relation at its other end and which element is provided with a self-closing inlet aperture structure of a certain diameter, inserting through said inlet aperture structure a food product feeding nozzle of lesser diameter than the inlet structure so as to provide an air escape opening at this location, injecting the food product into the container under pressure from the nozzle while the air within the container flows through said air escape opening and until the food product compactly fills the entire container, and then withdrawing the nozzle from the inlet aperture structure so as to effect self-closing action of the latter.

References Cited in the file of this patent

UNITED STATES PATENTS

| Number | Name | Date |
|---|---|---|
| Re. 20,920 | Nadelson | Nov. 15, 1938 |
| 799,863 | Myers | Sept. 19, 1905 |
| 1,111,294 | Camp | Sept. 22, 1914 |
| 1,357,304 | Valdes | Nov. 2, 1920 |
| 1,715,349 | Bodman | June 4, 1929 |
| 1,887,688 | Koch et al. | Dec. 19, 1929 |
| 1,892,466 | Kleess | Dec. 27, 1932 |
| 2,102,329 | Nelson | Dec. 14, 1937 |
| 2,180,882 | Royal | Nov. 21, 1939 |
| 2,220,913 | Ringler | Nov. 12, 1940 |
| 2,326,082 | Walter | Aug. 3, 1943 |
| 2,366,819 | Waggoner et al. | Jan. 9, 1945 |
| 2,391,296 | Coyle | Dec. 18, 1945 |
| 2,423,861 | Vogt | July 15, 1947 |
| 2,523,436 | Klaus | Sept. 26, 1950 |
| 2,528,332 | Bergquist | Oct. 31, 1950 |